Patented Mar. 15, 1949

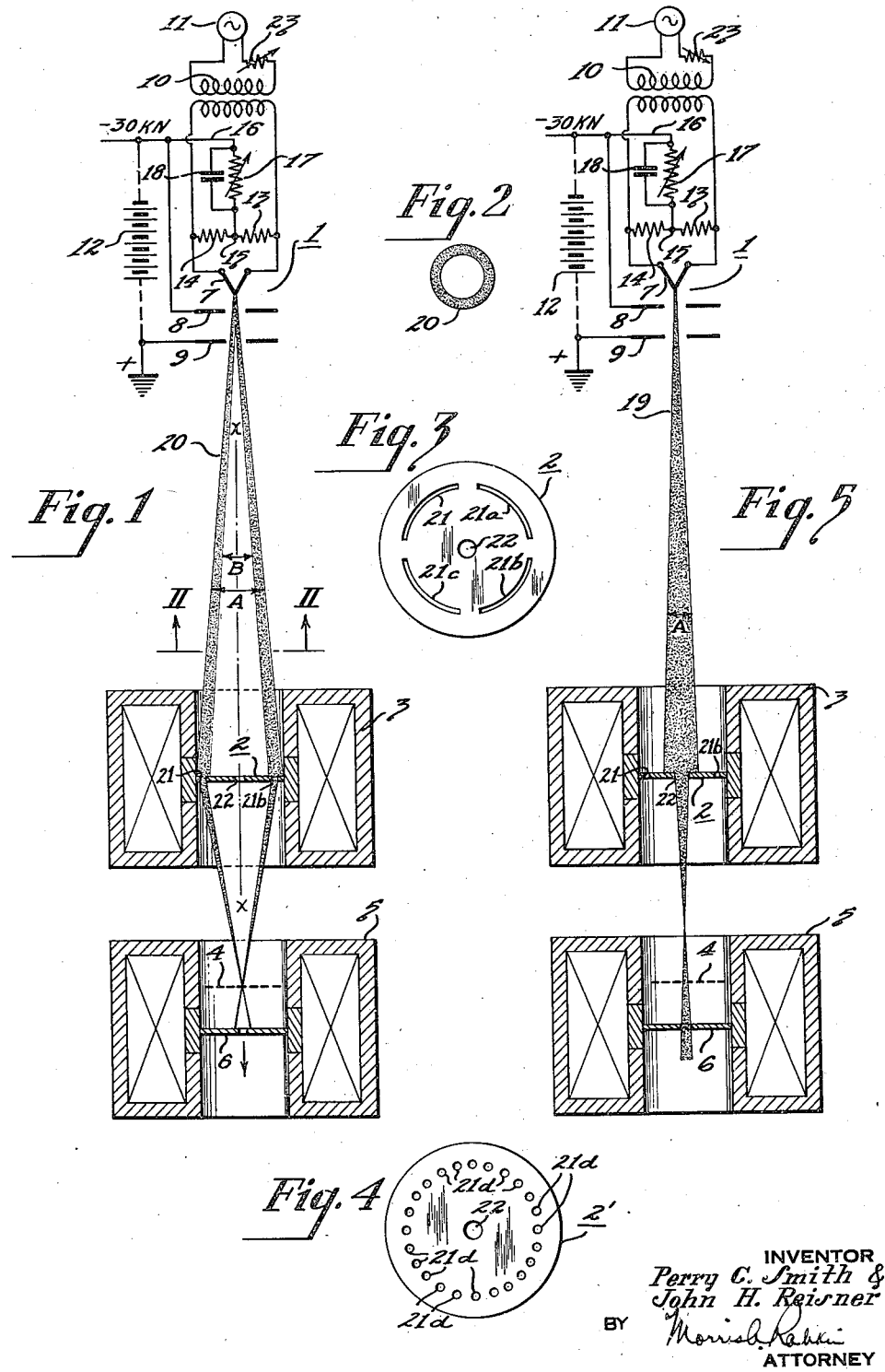

2,464,419

UNITED STATES PATENT OFFICE 2,464,419

METHOD OF AND APPARATUS FOR SELECTIVELY ACHIEVING ELECTRONIC DARK-FIELD AND BRIGHT FIELD ILLUMINATION

Perry C. Smith, Moorestown, and John H. Reisner, Haddonfield, N. J., assignors to Radio Corporation of America, a corporation of Delaware Application December 26, 1947, Serial No. 793,880

7 Claims. (Cl. 250—49.5)

This invention relates to electron-microscopy and has for its principal object to provide an improved method of an apparatus for selectively achieving dark-field and bright-field illumination of a specimen in an electron microscope.

The desirability of and requirements for achieving dark-field illumination in an electron-microscope are outlined in von Ardenne's "Electron-Ubermikroskopie" (p. 37) and by Zworykin et al. in "Electron Optics and the Electron Microscope" (pp. 133–134, 731). In principle, for dark-field illumination, the direct illumination must not pass through the objective aperture. In agreement with this principle, dark field illumination has heretofore been achieved in several ways, to wit: (1) By blanking the center portion of a solid cone-shape beam. This may be done by inserting in the condenser lens a diaphragm having an annular aperture, the central stop of the diaphragm being made so large that the inclination of the illuminating rays passing through the clear part of the diaphragm is greater throughout than the angle accepted by the objective aperture. One trouble with this procedure is that when a conventional electron-microscope is employed its vacuum must be broken in inserting and removing the said condenser diaphragm during the changeover from dark-field to bright-field illumination. Another serious objection to the use of such a diaphragm is that a large percentage of the electrons are prevented (by the central stop) from reaching the specimen, hence the intensity of the illumination is quite low. (2) Similar results can be attained, in accordance with the prior art, by moving a conventional condenser-aperture horizontally until its portion nearest the axis coincides in position with the rim of the central stop in the objective aperture. This of course involves the addition to the microscope of a suitable vacuum-tight mechanism for moving the condenser aperture. (3) The most intense dark-field illumination has heretofore been achieved by moving both the condenser lens and the beam source until the beam strikes the object at the required inclination. This, however, involves two costly changes in the design of the microscope, plus the attendant complications in the manipulation of its controls.

Accordingly, it is an object of the present invention to obviate the foregoing and other less apparent objections to present day methods and means for achieving electronic dark-field illumination.

Another and specific object of the present invention is to provide a method of, and apparatus for selectively achieving intense dark-field and bright-field illumination, instantly and without either breaking the vacuum of altering the focus or electron-optical alignment of the instrument. Stated generally, the present invention is predicated upon an appreciation of the fact that a microscope may be provided with a variably biased electron gun which may be so manipulated that the beam therefrom will assume either (a) the form of a "pencil" of rays suitable for bright-field illumination or (b) the form of a hollow cone having an annular base centered in a plane which is spaced from the specimen. In this latter case the electrons, of which the annular base of the hollow cone is comprised, may be directed (as by means of a conventional condenser lens) upon the specimen at the angle required for dark-field illumination, i. e. at an angle such that only the rays reflected from the specimen (and none of the "direct" rays) will pass through the objective aperture.

Certain preferred details of construction and operation and other objects and advantages of the invention will appear in the following specification and in the accompanying drawing, wherein:

Fig. 1 is a partly schematic sectional view taken along the optical axis of an electron-microscope having a variably biased gun, with the bias of the gun adjusted to provide an electron-beam in the form of a hollow cone suitable for dark-field illumination, Fig. 2 is a sectional view of the cone shape beam taken along the line 2—2 of Fig. 1, Fig. 3 is a plan view of the aperture within the condenser lens of the microscope of Fig. 1, Fig. 4 is a plan view of an alternative form of condenser aperture and Fig. 5 is a schematic view, similar to Fig. 1 but with the gun adjusted for bright-field illumination.

The parts of the electron-microscope with which the present invention is primarily concerned are: The electron gun, indicated generally at 1 (Figs. 1 and 5), and the optical or electron optical "aperture" 2 (Figs. 1, 3, 5, 2', Fig. 4) which is supported within the condenser lens 3. The wire screen or other holder 4 for the specimen, which is to be illuminated by the electrons from the gun 1, and the objective lens 5 and lens aperture 6 through which the electron-image passes to the fluorescent screen or other target (not shown) may be of conventional design.

The electron gun 1 comprises a "point" source of electrons which, in the instant case, takes the form of a V-shape filament 7 arranged with the point or apex of the V on the optical axis x—x of the microscope and in register with the aligned central apertures of the grid and anode electrodes 8 and 9, respectively. A filament transformer 10 supplies heating current to the cathode 7 from a 60 cycle or other convenient source of current 11. The anode 9 has a high (say 30 kilovolt) positive potential applied thereto from a source exemplified by the battery 12. The grid electrode 8 and the negative terminal of the high-voltage source 12 are both connected to the filament 7 through a center-tap resistor comprising resistor units 13 and 14 whose junction 15 receives the common return connection 16 through a variable bias-resistor 17 which is shunted by a suitable by-pass capacitor 18.

As previously indicated, the present invention is predicated upon an appreciation of the fact that the biasing voltage between the cathode 7 and grid 8 of the gun 1 may be varied in such a way that the electrons emanating from the source 1 will assume either (a) the form of a "pencil" or "solid beam" of rays 19 (see Fig. 5) suitable for bright-field illumination or (b) the form of a hollow cone 20 (see Fig. 1) having an annular base (see Fig. 2) centered in a plane which is spaced from the specimen and suitable for dark-field illumination. The "pencil" form of beam (shown in Fig. 5) for bright-field illumination is ordinarily achieved when the grid is biased at a relatively high negative potential (usually, about 100 volts) with respect to the cathode. In order to cause the beam to assume the form of a hollow cone (Fig. 1) for dark-field illumination the negative biasing potential on the grid, with respect to the cathode, is reduced, (usually to a value of less than 100 volts). Both adjustments are achieved by altering the setting of the variable resistor 17.

When the electron gun is biased for dark-field illumination, as it is in Fig. 1, the electrons are confined to the outer or peripheral portion of the condenser aperture 2; hence it is unnecessary to provide a stop at the center of the disclike member for "blanking" that part of the beam. This makes it possible to construct an apertured condenser member suitable for both dark-field and bright-field illumination and thus to obviate the necessity for changing the said condenser-lens member when the illumination is to be changed. Alternate forms of such a condenser-lens element are shown in Figs. 3 and 4. In Fig. 3 the clear parts of the disclike element 2, through which the dark-field rays pass in their journey to the specimen, are in the form of a series of arcuate slots 21, 21a, 21b, 21c arranged in circular array adjacent to the periphery of the disc in a position to pass substantially all of the rays of which the annular base of the electron cone of Figs. 1 and 2 is comprised and, in Fig. 4, substantially the same result is achieved by making the clear parts in the form of a multiplicity of similarly arranged circular holes 21d. A central hole or clear part 22 is provided in each of the condenser apertures 2, 2' of Figs. 3 and 4 to permit the passage of the constricted axially aligned pencil of rays (Fig. 5) necessary to achieve bright-field illumination.

The biasing voltage can be changed either by changing the setting of the bias resistor 17 or by changing the emission of the cathode e. g. by means of a rheostat 23 on the primary side of the filament transformer 10. As previously set forth, the grid voltage required for bright-field illumination is ordinarily about 100 volts negative with respect to the cathode, and less than 100 volts when the dark-field illumination is required. In one embodiment of the invention wherein the grid-cathode spacing was about 122 mils of an inch, and the grid-anode spacing was about 700 mils of an inch, the following operating parameters were observed when the value of the grid-resistor 17 was fixed at 1.5 megohms and the rheostat 23 was varied to provide the necessary changes in biasing voltage:

| Bias-voltage filament-to-cathode | Vertex Angle B (Fig. 1) of Electron Cone | Vertex Angle A (Figs. 1 and 2) |
| --- | --- | --- |
| | Degrees | Degrees |
| (1) 85 volts | 4 | 6.4 |
| (2) 100 volts | 2.1 | 5 |
| (3) 108 volts | 1.2 | 3.4 |
| (4) 111 volts | .0 | 2.6 |

The foregoing table dictated the following dimensions for the apertured condenser-lens element 2 when the said element was placed 8 inches from the anode of the gun: Diameter of the central aperture 22=50 mils of an inch; the arcuate slots 21 etc. were about 25 mils wide and defined a circle of 750 mils diameter. This perforate diaphragm 2 was received within a condenser-magnet coil 3 having a bore of one inch. It was noted that the mean angle subtended by the arcuate slots 21 etc. of the diaphragm 2 at the grid 8 of the gun was 5.6°, and the angle subtended by the center hole 22 at the grid, was less than 0.5°. Thus, for condition (1) of the foregoing table, none of the electrons passed through the central aperture and, since the angle of 5.6° subtended by the arcuate slots was within the cone of illumination (i. e. 4° to 6.4°), enough electrons passed through the said slots to provide intense dark-field illumination when redirected to the specimen by the condensing action of the lens 3. Condition 4 of the table shows that no electrons passed through the peripherally located arcuate apertures 21, etc. since the total angular width of the beam was less than the angle (5.6°) subtended by the arcuate slots, while the central aperture 22 was completely bathed by the beam as is required for bright-field illumination.

It will now be apparent that the present invention provides a novel method of and apparatus for selectively achieving intense dark-field and bright-field illumination, instantly and without breaking the vacuum or altering the focus or electron-optical alignment of the instrument.

What is claimed is:

1. In an electron-optical instrument, the combination with an electron-lens through which electrons travel from a source to a specimen, of a diaphragm mounted within said lens and containing a central aperture through which said electrons may be directed when said specimen is to be subjected to bright-field illumination and a plurality of peripherally arranged apertures through which said electrons may be directed when said specimen is to be subjected to dark-field illumination.

2. The invention as set forth in claim 1 and wherein said peripherally arranged apertures are of arcuate contour and define clear spaces substantially surrounding said central aperture.

3. The invention as set forth in claim 1 and wherein said electron-lens comprises a magnetic condenser-lens.

4. An electron optical instrument comprising, a source of electrons, an electron lens through which electrons travel from said source to a specimen, a diaphragm mounted within said lens and containing a central aperture and a peripheral aperture, and means intermediate said source and said lens for directing said electrons, selectively, through said central and said peripheral apertures whereby to alter the angle at which said electrons impinge upon said specimen.

5. The invention as set forth in claim 4 and wherein said electron-directing means comprises an electrode surrounding the path of said electrons adjacent to said source and means for subjecting said electrode to a controllable biasing potential and thereby to control the cross-sectional pattern of said electrons.

6. Method of producing dark-field illumination of a specimen in an electron-microscope having an adjustably biased electron gun, said method comprising adjusting the bias on said gun to produce a hollow cone-shaped beam, and then converging the electrons comprising the annular base of said hollow cone upon said specimen.

7. Method of producing dark-field illumination of a specimen mounted on the optical axis of an electron-microscope of the type having a source of electrons and a variably biased control electrode for said electrons, said method comprising adjusting the bias of said control electrode to produce a hollow cone-shaped electron beam having an annular base concentric with said axis in a plane spaced from said specimen, and then directing the electrons of which the annular base of said cone-shape beam is comprised upon said specimen at an angle with respect to said optical axis.

PERRY C. SMITH.
JOHN H. REISNER.

No references cited.